United States Patent [19]

Kizaki et al.

[11] 4,296,604
[45] Oct. 27, 1981

[54] TANDEM MASTER CYLINDER

[75] Inventors: Jiro Kizaki; Takashi Fujii, both of Toyota, Japan

[73] Assignees: Aisin Seiki Kabushiki Kaisha, Kariya; Toyota Jidosha Kogyo Kabushiki Kaisha, Toyota, both of Japan

[21] Appl. No.: 194,620

[22] Filed: Oct. 6, 1980

Related U.S. Application Data

[63] Continuation of Ser. No. 966,596, Dec. 5, 1978, abandoned.

[30] Foreign Application Priority Data

Dec. 5, 1977 [JP] Japan .................................. 52-163754

[51] Int. Cl.³ ............................................. B60T 11/20
[52] U.S. Cl. ................................................... 60/562
[58] Field of Search .................... 60/562, 581; 92/167, 92/129

[56] References Cited

U.S. PATENT DOCUMENTS 3,928,970 12/1975 Farr ........................................ 60/562

Primary Examiner—Abraham Hershkovitz
Attorney, Agent, or Firm—Finnegan, Henderson, Farabow, et al.

[57] ABSTRACT

A tandem master cylinder comprising a first plunger mechanically connected to a foot brake pedal and a second plunger separated from the first plunger to define one of the two fluid chambers. A T-shaped intermediate member provided with a retainer head is interposed between two plungers so as to limit the spaced distance therebetween and mount a return spring on the retainer head abutting the second plunger. The retainer head is of a reduced diameter thereby providing an annular gap between the retainer head and the inner wall of the cylinder body. Thus undesirable injury to the inner wall due to radial displacement of the retainer head will be avoided.

2 Claims, 1 Drawing Figure

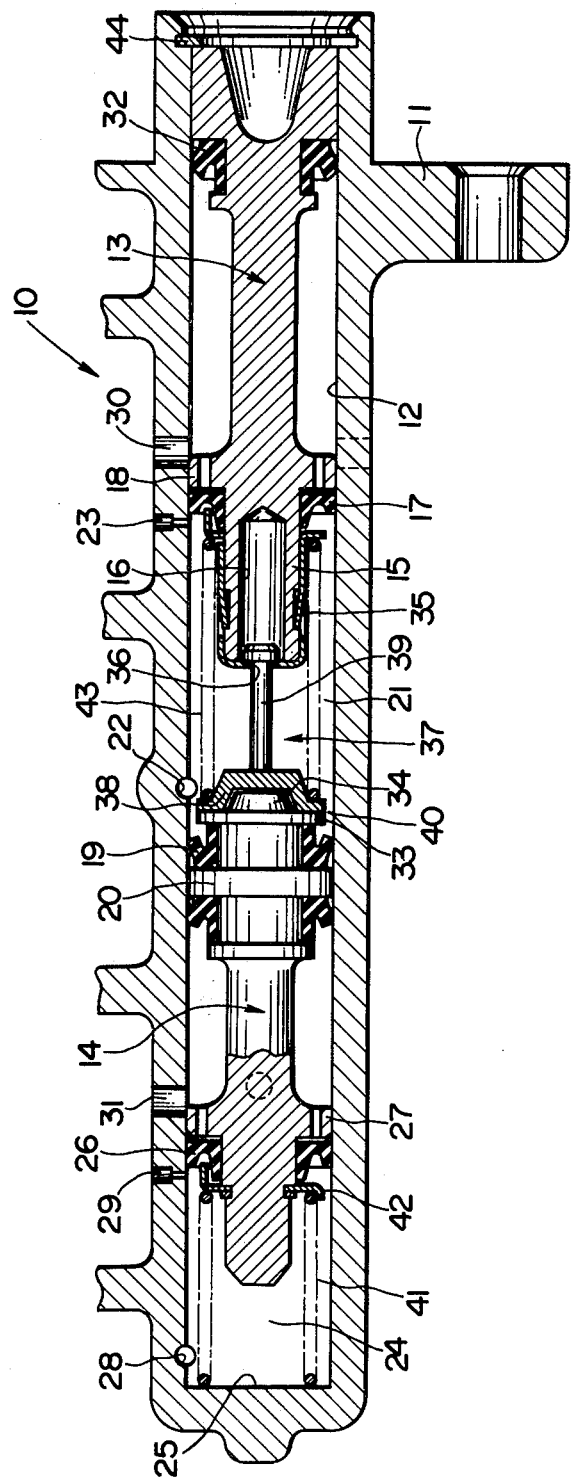

TANDEM MASTER CYLINDER

This is a continuation of application Ser. No. 966,596 filed Dec. 5, 1978, now abandoned.

BACKGROUND OF THE INVENTION

This invention relates to a master cylinder for automotive vehicles and more particularly to a tandem master cylinder which comprises two independent fluid chambers fluidically connected to wheel cylinders.

In order to constitute two independent fluid chambers in the cylinder body it is necessary to provide a primary plunger to be actuated by the foot pedal and a secondary plunger operatively connected to the first plunger to define one of the two fluid chambers therebetween. In order to operatively connect the second plunger to the first plunger it is also necessary to provide a return spring interposed between the two plungers.

One type of such tandem master cylinders comprises an intermediate member slidably fitted to the first plunger and abutting the second plunger.

The intermediate member is provided primarily to define the distance between two plungers thereby permitting the setting load of the spring to be stronger than the setting load of the other return spring disposed in the other fluid chamber and normally urging the second plunger toward the first plunger. As a result, two fluid chambers may be pressurized simultaneously or one chamber may be pressurized in advance of the other chamber. In the event of the hydraulic failure of the one fluid chamber the second plunger will be mechanically actuated due to the sliding movement of the first plunger with respect to the intermediate member with the smallest loss of the pedal stroke.

Such an intermediate member comprises a retainer head which abuts on the second plunger to receive one end of the spring, thereby serving as a spring.

The conventional spring retainer, however, is of a diameter substantially equal to the diameter of the cylinder bore. Consequently, the inner wall of the bore is subjected to injury due to engagement with the retainer which is caused by vehicle vibration or the radial urging force of the spring on the retainer.

SUMMARY OF THE INVENTION

It is, therefore, one of the objects of the invention to provide a tandem master cylinder which will obviate the difficulties in the conventional tandem master cylinder.

It is another object of the invention to provide a tandem master cylinder in which annular clearance or gap is provided between an inner wall of the cylinder bore and a spring retainer.

It is a further object of the invention to provide a tandem master cylinder in which a spring retainer of a reduced diameter is fitted onto one of two plungers which is actuated by the movement of the other plunger.

These and other objects will become apparent from reading this specification and viewing the drawing.

BRIEF DESCRIPTION OF THE DRAWING

The single FIGURE is a longitudinal cross section of one embodiment of a tandem master cylinder in accordance with the present invention.

DETAILED DESCRIPTION OF THE PREFERRED EMBODIMENT

Referring to the drawing, a tandem master cylinder generally indicated by the reference numeral 10 includes a body 11 provided with an axial bore 12 and fixed to the stationary part of the vehicle (not shown). Within the bore 12 of the cylinder body 11 are slidably fitted a first plunger 13 and a second plunger 14 which are arranged in coaxial relationship with each other. The first plunger 13 is connected at the right end thereof to a push rod (not shown) which is in turn connected to a brake foot pedal (again not shown), and is provided at the left end thereof with a reduced diameter portion 15 which is formed with an axial hole 16. A seal 17 is carried by shoulder 18 of the first plunger 13. Another seal 19 is carried by a shoulder 20 of the second plunger 14.

Thus a first fluid chamber 21 is formed (between two seals 17 and 19), which is in fluid connection with rear wheel cylinders (not shown) via an outlet 22. The first fluid chamber 21 is also in fluid communication with a first brake fluid reservoir (not shown) via a compensating port 23.

A second fluid chamber 24 is constituted between a bottom wall 25 of the cylinder body 11 and a seal 26 carried by a shoulder 27 of the second piston 14, and is in fluid communication with front wheel cylinders (not shown) via an outlet 28. The second fluid chamber 24 is also in fluid communication with a second brake oil reservoir (not shown) via a compensating port 29. Openings 30 and 31 are provided on the body 11 to communicate with the first and the second reservoirs, respectively, so as to prevent vacuum formation rearward of the pressure-creating faces of the plungers 13 and 14. A seal 32 is mounted on the first plunger 13 to prevent fluid leakage from the bore 12 to the outside of the cylinder body 11.

The second plunger 14 is formed at the right end thereof with a reduced diameter flange 33 and a convex tip 34. On the reduced diameter portion 15 of the first plunger 13 is fixedly mounted a sleeve-shaped spring retainer 35 which is provided with a central aperture 36 substantially coaxial with the hole 16 of the first plunger 13.

An intermediate member 37, usually seen as T-shaped in cross-section, includes a hat-shaped head 38 to fit with the convex tip 34 of the second plunger 14 and a stick stem 39 integral therewith and slidably received in the axial hole 16 of the first plunger 13 through the central aperture 36 of the sleeve retainer 35.

It is to be noted that the diameter of the head 38 is substantially equal to the diameter of the flange 33 of the second plunger 14 thereby providing an annular gap 40 between the bore 12 and the head 38 of the member 37.

A coiled return spring 41 is interposed between the bottom wall 25 of the body 11 and a spring retainer 42 secured to the second plunger 14, thereby normally urging the second plunger 14 to move in the right direction. Another coiled return spring 43 is interposed between the head 38 of the member 37 and the sleeve retainer 35 to normally urge the first plunger 13 and the second plunger 14 to move in opposite directions. The retracted position of the first plunger 13 is defined by a snap ring 44 fixed to the body 11. The coil spring 43 is of greater setting load than the coil spring 41. However, the member 37 defines the spaced distance between two plungers 13 and 14 so that the spring 43 will impart no force to the second plunger 14 upon assembling.

In operation, when the brake pedal is depressed to move the first plunger 13 to the left, the seal 17 closes the compensating port 23 to generate the fluid pressure in the first fluid chamber 21. The second plunger 14 will be moved initially due to the spring 43 so as to close the port 29 by the seal 26 and then due to pressure in the first chamber 21. Thus the second fluid chamber 24 may be pressurized simultaneously with the first fluid chamber 21 because the setting load of spring 43 is greater than the setting load of spring 41. During the movement of the first and the second plungers 13 and 14, the T-shaped member 37 is subjected to radial vibration due to vehicle movement and the weight of the member 37. In addition, the coil spring 43 may impart radial force to the head 38 of the member 37. Objectionable displacement of the head 38 which will cause injury to the inner surface of the cylinder body 11 will be avoided due to provision of the annular gap 40.

It will be apparent in another embodiment of the invention that the concave head 38 of the member 37 may be formed in a convex shape while the convex tip 34 of the second plunger 14 may be formed in a concave shape to fit with the convex head of the intermediate member 37.

Various modifications may be made in the specific structure illustrated without departing from the spirit and scope of the invention.

What is claimed is:

1. A tandem master cylinder comprising:
   a. a body having an axial bore therein;
   b. a first plunger sealingly and slidably fitted within said axial bore;
   c. a second plunger sealingly and slidably fitted within the axial bore and being axially spaced from said first plunger for defining a first chamber between said first and second plungers, and being axially spaced from the end of said body remote from said first plunger for defining a second chamber between said body and said second plunger, said second plunger including a reduced diameter flange at its axial end proximate said first plunger and a protrusion extending from the central portion of said flange;
   d. first seal means for sealing said first chamber;
   e. second seal means for sealing said second chamber;
   f. an intermediate member disposed between and movable with respect to said first and second plungers for defining the distance between said plungers, said member including a stick-shaped stem having a head portion secured to one end thereof in slidable engagement with an axial hole in said first plunger and having a hat-shaped head secured to the other end thereof movably abutting said flange and including a centrally located recess complementary to and movably seated over said protrusion on said second plunger, the outer diameter of said hat-shaped head and said flange being substantially equal and being less than the inner diameter of said axial bore for providing an annular gap between said intermediate member and the inner wall of said axial bore and the inner dimensions of said recess restricting radial movement of said hat-shaped head to maintain the gap between the axial bore and the intermediate member;
   g. a sleeve-shaped retainer secured to the end of said first plunger opposite said second plunger for retaining said head portion of said intermediate member in said axial hole;
   h. a first return spring interposed between said retainer and a seat portion of said hat-shaped head for urging said first and second plungers apart;
   i. a second return spring having a setting load smaller than said first return spring disposed in said second chamber for urging said second plunger towards said first plunger;
   j. a first compensating port for fluid communication with said first chamber being opened and closed by said first seal means during axial movement of said first plunger; and
   k. a second compensating port for fluid communication with said second chamber being opened and closed by said second seal means during axial movement of said second plunger.

2. The tandem master cylinder of claim 1 wherein said first seal means comprises an annular seal member secured to said first plunger and an annular seal member secured to the end of said second plunger proximate said first plunger, the annular seal member on said first plunger acting to open and close said first compensating port, and wherein said second seal means comprises an annular seal member secured to the end of said second plunger remote from said first plunger.

* * * * *